(12) United States Patent
Deodhar et al.

(10) Patent No.: US 10,887,102 B2
(45) Date of Patent: Jan. 5, 2021

(54) INTENT FRAMEWORK

(71) Applicant: Nutanix, Inc., San Jose, CA (US)

(72) Inventors: Akshay Deodhar, Cupertino, CA (US); Constantine Andrew Kousoulis, San Jose, CA (US); Gregory A. Smith, Oakland, CA (US); Hemanth Kumar Mantri, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 260 days.

(21) Appl. No.: 15/832,867

(22) Filed: Dec. 6, 2017

(65) Prior Publication Data

US 2018/0176016 A1 Jun. 21, 2018

Related U.S. Application Data

(60) Provisional application No. 62/434,873, filed on Dec. 15, 2016.

(51) Int. Cl.
*H04L 9/08* (2006.01)
*H04L 9/32* (2006.01)
(Continued)

(52) U.S. Cl.
CPC ............... *H04L 9/32* (2013.01); *G06F 8/656* (2018.02); *G06F 9/45512* (2013.01);
(Continued)

(58) Field of Classification Search
CPC combination set(s) only.
See application file for complete search history.

(56) References Cited

U.S. PATENT DOCUMENTS

| 7,725,671 B2 | 5/2010 | Prahlad et al. |
| 7,779,263 B2 * | 8/2010 | Kanai ............... G06F 21/33 713/182 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Khoi V Le
(74) *Attorney, Agent, or Firm* — Foley & Lardner LLP

(57) ABSTRACT

A method of managing servers of a distributed computer system by using an intent-based CLI (command line interface) executing by one or more processors of a remote computing device, the servers hosting a virtual cluster comprising one or more virtual machines. The method includes receiving, by a first server of the servers, a connection-request from the intent-based CLI to establish an encrypted connection between the first server and the remote computing device. The method includes authenticating the connection-request and establishing, in response to authenticating the connection-request, a first encrypted communication channel between the first server and the remote computing device. The method includes receiving, via the first encrypted communication channel, an operation-request for a list of intent-based operations supported by the first server. The method includes building, by the first server and in response to receipt of the operation-request, a list of intent-based operations supported by the first server.

24 Claims, 3 Drawing Sheets

(51) Int. Cl.

| | |
|---|---|
| *H04L 9/14* | (2006.01) |
| *H04L 29/08* | (2006.01) |
| *G06F 9/50* | (2006.01) |
| *G06F 9/455* | (2018.01) |
| *G06F 21/44* | (2013.01) |
| *H04L 29/06* | (2006.01) |
| *G06F 8/656* | (2018.01) |
| *G06F 9/46* | (2006.01) |

(52) U.S. Cl.
CPC ......... *G06F 9/45558* (2013.01); *G06F 9/461* (2013.01); *G06F 9/5077* (2013.01); *G06F 9/5088* (2013.01); *G06F 21/44* (2013.01); *H04L 9/0844* (2013.01); *H04L 9/14* (2013.01); *H04L 63/0428* (2013.01); *H04L 63/08* (2013.01); *H04L 67/141* (2013.01); *G06F 2009/4557* (2013.01); *G06F 2009/45591* (2013.01); *G06F 2209/505* (2013.01)

(56) References Cited

U.S. PATENT DOCUMENTS

| | | | |
|---|---|---|---|
| 7,840,533 | B2 | 11/2010 | Prahlad et al. |
| 8,447,728 | B2 | 5/2013 | Prahlad et al. |
| 8,549,518 | B1 | 10/2013 | Aron et al. |
| 8,601,473 | B1 | 12/2013 | Aron et al. |
| 8,762,335 | B2 | 6/2014 | Prahlad et al. |
| 8,850,130 | B1* | 9/2014 | Aron .................. G06F 3/0641 711/150 |
| 9,740,723 | B2 | 8/2017 | Prahlad et al. |
| 9,772,866 | B1 | 9/2017 | Aron et al. |
| 9,924,009 | B2* | 3/2018 | Yoo .................. H04M 1/72519 |
| 9,971,589 | B2 | 5/2018 | Chittigala et al. |
| 10,210,048 | B2 | 2/2019 | Sancheti |
| 10,248,657 | B2 | 4/2019 | Prahlad et al. |
| 2006/0085824 | A1 | 4/2006 | Bruck et al. |
| 2007/0078991 | A1* | 4/2007 | Kim .................. G06Q 10/10 709/228 |
| 2011/0251899 | A1* | 10/2011 | Proulx .................. G06Q 30/02 705/14.64 |
| 2016/0112241 | A1* | 4/2016 | Kaushik ................ H04L 41/026 709/223 |
| 2016/0197844 | A1 | 7/2016 | Smith et al. |
| 2016/0203166 | A1 | 7/2016 | Aron et al. |
| 2016/0246833 | A1 | 8/2016 | Eberlein et al. |
| 2017/0063947 | A1* | 3/2017 | Ziskin ................ H04L 63/0807 |
| 2017/0364345 | A1* | 12/2017 | Fontoura .................. G06F 9/52 |
| 2018/0032323 | A1* | 2/2018 | Roy .......................... G06F 9/50 |
| 2018/0054463 | A1* | 2/2018 | Chang .................. H04W 12/02 |
| 2018/0165157 | A1 | 6/2018 | Olinsky et al. |
| 2018/0176016 | A1 | 6/2018 | Deodhar et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "Tne Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.

* cited by examiner

INTENT FRAMEWORK

CROSS REFERENCE TO RELATED APPLICATION

This application claims priority to U.S. Provisional Application 62/434,873, filed Dec. 15, 2016, incorporated by reference in its entirety.

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

SUMMARY

Aspects of the present disclosure relate generally to a virtualization environment, and more particularly to a system for managing servers of a distributed computer system by using an intent-based CLI (command line interface).

One implementation disclosed herein is a method of managing servers of a distributed computer system by using an intent-based CLI (command line interface) executing by one or more processors of a remote computing device, the servers hosting a virtual cluster comprising one or more virtual machines. The method includes receiving, by a first server of the servers, a connection-request from the intent-based CLI to establish an encrypted connection between the first server and the remote computing device. In some implementations, the method includes authenticating, by the first server, the connection-request. In some implementations, the method includes establishing, by the first server and in response to authenticating the connection-request, a first encrypted communication channel between the first server and the remote computing device. In some implementations, the method includes receiving, by the first server and via the first encrypted communication channel, an operation-request for a list of intent-based operations supported by the first server. In some implementations, the method includes building, by the first server and in response to receipt of the operation-request, a list of intent-based operations supported by the first server. In some implementations, the method includes transmitting, by the first server and via the first encrypted communication channel, the list of intent-based operations to the remote computing device causing the remote computing device to render the list of intent-based operations in the intent-based CLI.

In some implementations, each intent-based operation of the list of intent-based operations comprises a plurality of operation calls supported by the first server. In some implementations, at least one intent-based operation of the list of intent-based operations comprises an operation call supported by a first virtual machine executing on the first server and an operation call supported by a second virtual machine executing on the first server. In some implementations, the method includes establishing, by a second server, a second encrypted communication channel between the second server and the remote computing device. In some implementations, the method includes receiving, by the second server and via the second encrypted communication channel, a second operation-request for a list of intent-based operations supported by the second server. In some implementations, the method includes building, by the second server and in response to receipt of the second operation-request, a new list of intent-based operations. In some implementations, the method includes transmitting, by the second server and via the second encrypted communication channel, the new list of intent-based operations to the remote computing device causing the remote computing device to render the new list of intent-based operations in the intent-based CLI.

In some implementations, at least one intent-based operation of the new list of intent-based operations comprises a plurality of operation calls supported by the first server and the second server.

In some implementations, establishing the second encrypted communication channel between the second server and the remote computing device comprises maintaining, by the first server, the first encrypted communication channel between the first server and the remote computing device.

In some implementations, the operation-request created based on one of at least a tab completion system and an automatic assistant system.

In some implementations, the method includes receiving, by the first server and via the first encrypted communication channel, an intent-based operation of the list of intent-based operations. In some implementations, the method includes executing, by the first server, the intent-based operation as a versioning control hook. In some implementations, the method includes receiving, by the first server and via the first encrypted communication channel, a request to scale the virtual cluster. In some implementations, the method includes scaling, by the first server and in response to the request to scale the virtual cluster, by executing a command to remove a virtual machine from the virtual cluster or add a virtual machine to the virtual cluster.

In some implementations, the list of intent-based operations comprises at least one of a state transition request and a status completion request.

In some implementations, the method includes receiving, by the first server and via the first encrypted communication channel, an intent-based operation of the list of intent-based operations. In some implementations, the method includes processing, by the first server, the intent-based operation to a logical intent of the intent-based operation based on a single receipt of the intent-based operation by the first server.

In another aspect, the present disclosure is directed to a system for managing servers of a distributed computer system by using an intent-based CLI (command line interface) executing by one or more processors of a remote computing device, the servers hosting a virtual cluster comprising one or more virtual machines. The system includes the remote computing device; and a first server of the servers. The first server configured to receive a connection-request from the intent-based CLI to establish an encrypted connection between the first server and the computing device. In some implementations, the first server configured to authenticate the connection-request. In some implementations, the first server configured to establish, in response to authenticating the connection-request, a first encrypted communication channel between the first server and the computing device. In some implementations, the first server configured to receive, via the first encrypted communication channel, an operation-request for a list of intent-based operations supported by the first server. In some implementations, the first server configured to build, in response to receipt of the operation-request, a list of intent-based operations supported by the first server. In some implementations, the first server configured to transmit, via the first encrypted communication channel, the list of intent-based operations to the computing device causing the computing device to render the list of intent-based operations in the intent-based CLI.

In some implementations, each intent-based operation of the list of intent-based operations comprises a plurality of operation calls supported by the first server.

In some implementations, at least one intent-based operation of the list of intent-based operations comprises an operation call supported by a first virtual machine executing on the first server and an operation call supported by a second virtual machine executing on the first server.

In some implementations, the system includes a second server of the servers. The second server configured to establish a second encrypted communication channel between the second server and the computing device. In some implementations, the second server configured to receive, via the second encrypted communication channel, a second operation-request for a list of intent-based operations supported by the second server. In some implementations, the second server configured to build, in response to receipt of the second operation-request, a new list of intent-based operations. In some implementations, the second server configured to transmit, via the second encrypted communication channel, the new list of intent-based operations to the computing device causing the computing device to render the new list of intent-based operations in the intent-based CLI.

In some implementations, at least one intent-based operation of the new list of intent-based operations comprises a plurality of operation calls supported by the first server and the second server.

In some implementations, the first server further configured to maintain the first encrypted communication channel between the first server and the computing device while the second server establishes the second encrypted communication channel between the second server and the computing device.

In some implementations, the operation-request created based on one of at least a tab completion system and an automatic assistant system.

In some implementations, the first server further configured to receive, via the first encrypted communication channel, an intent-based operation of the list of intent-based operations. In some implementations, the first server further configured to execute the intent-based operation as a versioning control hook.

In some implementations, the first server further configured to receive, via the first encrypted communication channel, a request to scale the virtual cluster. In some implementations, the first server further configured scale, in response to the request to scale the virtual cluster, by executing a command to remove a virtual machine from the virtual cluster or add a virtual machine to the virtual cluster.

In some implementations, the first server further configured to receive, via the first encrypted communication channel, an intent-based operation of the list of intent-based operations. In some implementations, the first server further configured to process the intent-based operation to a logical intent of the intent-based operation based on a single receipt of the intent-based operation by the first server.

In another aspect, the present disclosure is directed to a non-transitory computer readable storage device having a processor-executable instructions embodied thereon, for managing servers of a distributed computer system by using an intent-based CLI (command line interface) executing by one or more processors of a remote computing device, the servers hosting a virtual cluster comprising one or more virtual machines. In some implementations, when executed by a first server of the servers, the processor-executable instructions cause the first server to perform the steps of receiving a connection-request from the intent-based CLI to establish an encrypted connection between the first server and the remote computing device. In some implementations, when executed by a first server of the servers, the processor-executable instructions cause the first server to perform the steps of authenticating the connection-request. In some implementations, when executed by a first server of the servers, the processor-executable instructions cause the first server to perform the steps of establishing, in response to authenticating the connection-request, a first encrypted communication channel between the first server and the remote computing device. In some implementations, when executed by a first server of the servers, the processor-executable instructions cause the first server to perform the steps of receiving, via the first encrypted communication channel, an operation-request for a list of intent-based operations supported by the first server. In some implementations, when executed by a first server of the servers, the processor-executable instructions cause the first server to perform the steps of building, in response to receipt of the operation-request, a list of intent-based operations supported by the first server. In some implementations, when executed by a first server of the servers, the processor-executable instructions cause the first server to perform the steps of transmitting, via the first encrypted communication channel, the list of intent-based operations to the remote computing device causing the remote computing device to render the list of intent-based operations in the intent-based CLI.

BRIEF DESCRIPTION OF THE DRAWINGS

Illustrative embodiments will hereafter be described with reference to the accompanying drawings.

Like reference numbers and designations in the various drawings indicate like elements.

DETAILED DESCRIPTION

Figure 1A:
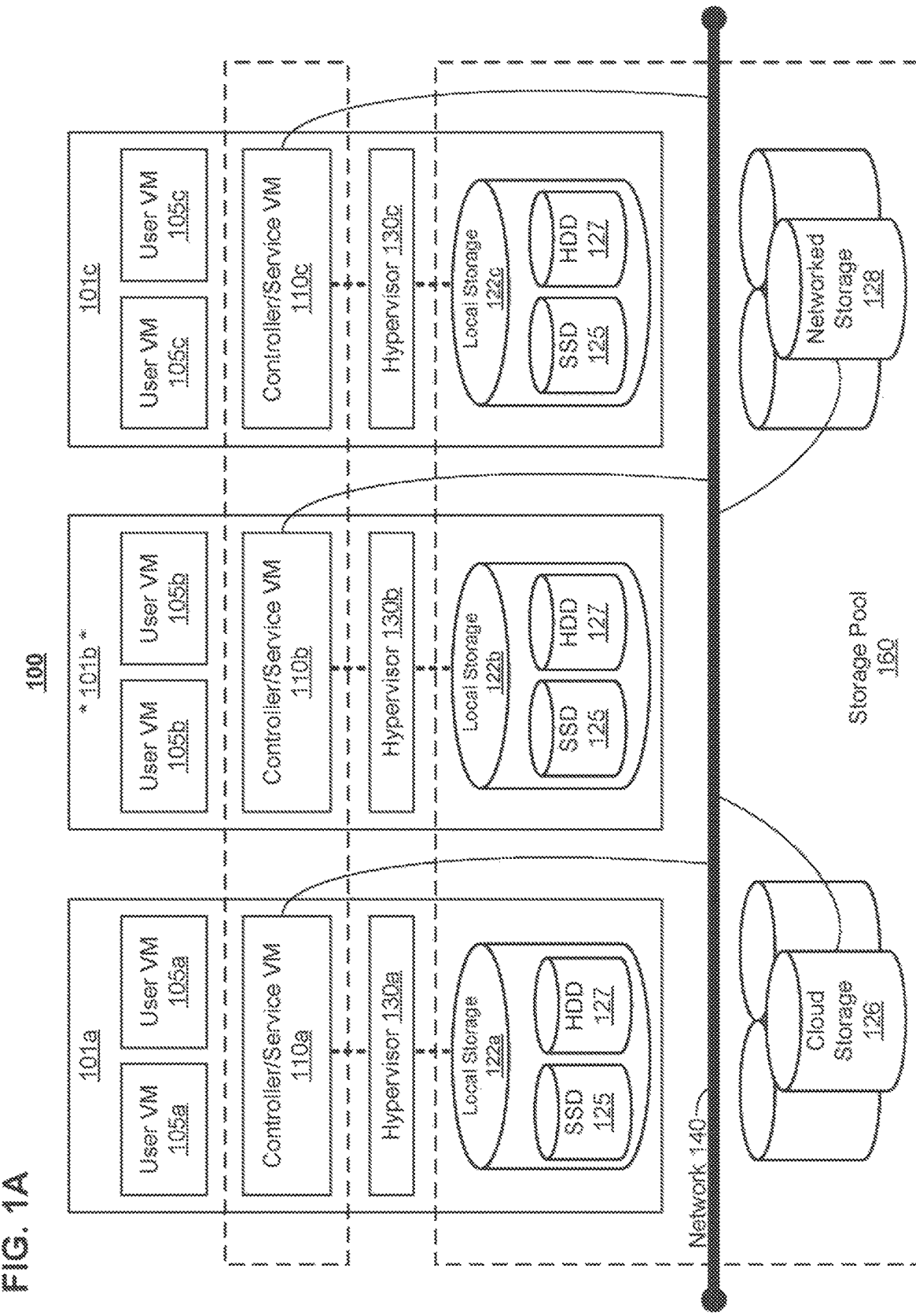
FIG. 1A illustrates a clustered virtualization environment 100 according to particular embodiments.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1A illustrates a clustered virtualization environment 100 according to particular embodiments. The architecture of FIG. 1A can be implemented for a distributed platform that contains multiple host machines 101a-c that manage multiple tiers of storage. The multiple tiers of storage may include storage that is accessible through network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122a-c that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101a-c may run virtualization software, such as VMWARE ESX(I), MICROSOFT HYPER-V, or REDHAT KVM. The virtualization software includes hypervisor 130a-c to create, manage, and destroy user VMs 105, as well as managing the interactions between the underlying hardware and user VMs 105. User VMs 105 may run one or more applications that may operate as "clients" with respect to other elements within virtualization environment 100. In particular embodiments, one or more lightweight application containers (e.g., DOCKER containers) virtualizing the operating system by encapsulating dependencies (e.g., executable binaries or libraries) within may be deployed on a user VM 105. Though not depicted in FIG. 1A, a hypervisor may connect to network 140. In particular embodiments, a host machine 101 may be a physical hardware computing device; in particular embodiments, a host machine 101 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
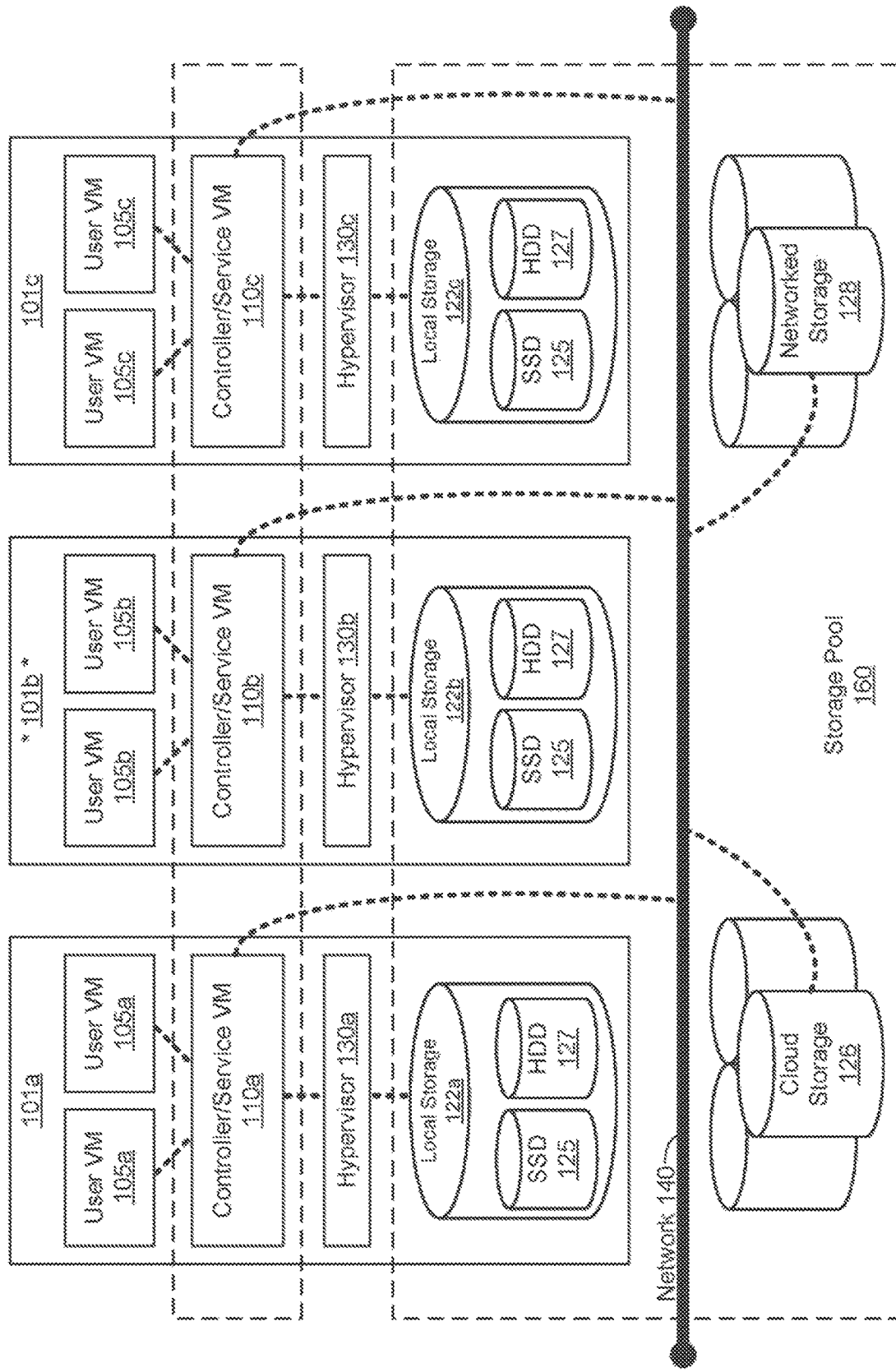
FIG. 1B illustrates data flow within an example clustered virtualization environment 100 according to particular embodiments.

FIG. 1B illustrates data flow within an example clustered virtualization environment 100 according to particular embodiments. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 101a, by connecting via network 140 to cloud storage 126 or NAS 128, or by connecting via network 140 to local storage 122b-c within another host machine 101b-c (e.g., via connecting to another CVM 110b or 110c). In particular embodiments, any suitable computing system 200 may be used to implement a host machine 101.

PAT-240: Particular embodiments provide a state-based framework for managing changes to infrastructure elements of a virtualization environment. In order to transition from a current state to a target state, particular embodiments may simply require specification of the target state, rather than step-by-step instructions to achieve the target state. The current state of the virtualization environment may be described as a hierarchical collection of entities, each of which may comprise a group of sub-entities, and a state of each of the entities in the collection. For example, as illustrated in FIGS. 1A and 1B, each entity in virtualization environment 100 may be represented using an entity specification, such as, for example:

```
{
    "api_version": "string",
    "metadata": {
        "type": "string"
        ....
    }
}
```

-continued

```
    "spec": { ... }
    "status": { ... }
}
```

In particular embodiments, elements of the example specification may include:
"metadata": a section for specifying metadata for the entity
"type": a section for specifying the type of the entity
"spec": a section for specifying the desired state of the entity
"status": a section for specifying the current state of the entity Collections of entities in virtualization environment 100 may be represented using an entity list specification, such as, for example:

```
{
    "api_version": "string",
    "metadata": {
        "type": "string"
        "total_matches": "int",
        "offset": "int",
        "length": "int",
        "filter": "string",
        "sort": "string",
        "fields": [ "string" ],
    }
    "entities": [
    ]
}
```

In particular embodiments, entity types may fall into one of two categories: resource entity types (e.g., for entities that represent a physical or virtual infrastructure resource, by way of example and not limitation: vm, alert, app, volume_group) or helper entity types (for entities that are used in conjunction with infrastructure resources, by way of example and not limitation: alert, event, status). In particular embodiments, resource entity types may further fall into one of two subcategories: basic resource types (e.g., vm) or related resource types that are related to basic resource-type entities (e.g., vm_backup, vm_snapshot, vm_profile, vm_template). All resource types may support one or more common actions (e.g., create( ), destroy( ), snapshot( ), restore( ), move( ), clone( ), diff( )).

For example, each entity deemed to be a resource entity type may be represented using an entity specification, such as, for example:

```
{
    "api_version": "string",
    "metadata": {
        "type": "string"
        "UUID": "string"
        "description": "string"
        "parent_reference": "reference"
        "entity_version": "int"
        "creation_time": "string"
        "last_update_time": "string"
        "categories": {
            "category_name1": "value"
            "category_name2": "value"
        }
        "spec": { ... }
        "resources": {
            "sub-resource_name_reference": "reference"
            "field_name_factory": "factory"
```

-continued

```
   }
   "policies": {
      "expiration": { ... }
      "backups": { ... }
   }
   "status": {
      "name": "string"
      "availability_zone_reference": "reference"
      "resources": { ... }
      "policies": { ... }
      "providers": { ... }
      "conditions": { ... }
      "stats_reference": "reference"
      "events_reference": "reference"
      "profile_compliance": { ... }
   }
}
```

In particular embodiments, the parent_reference field may be modified by the user. In particular embodiments, the categories section may comprise a set a string keys mapped to string values that indicate the policies to be enforced on this entity. In particular embodiments, the spec section may specify all settings that affect the behavior of the entity, its relationships to other entities, or particular settings that may take time to change). In particular embodiments, the resources field may specify all resources that should be owned by this entity (e.g., if not all of the resources are available at the time when evolution is attempted, particular embodiments may keep the status of the state transition request as pending until all of the resources are available). In particular embodiments, the policies field may specify all settings that modify the behavior of this entity (e.g., expiration policy, security policy, backup policy, other custom policies). In particular embodiments, the status field is not included in snapshots. In particular embodiments, the availabiity_zone_reference field may specify a reference to the availability zone from which this entity derives its resources. In particular embodiments, the providers field may be a section of the spec that the external providers own and maintain (including the corresponding status).

All entities that exist independently and do not depend on some other entity for their meaningful existence may be represented in the top level application-programming interface (API): /<entity_kind_plural>. Other entities may only exist as children of a parent entity in the hierarchy; such entities may be represented in the parent API: /<parent_entity_kind_plural>/{UUID}/<child_entity_kind_plural>/{child_UUID}. In particular embodiments, all entities may explicitly specify relationships in their entity specification. Particular embodiments may enable promotion of a child entity type to a top-level entity without having to change any resource's specification.

PAT-229 ("Efficient Spec execution in intentful systems"): Particular embodiments of an intent engine may receive a state transition request comprising a target state specification for an entity or a list of entities. In particular embodiments, when an entity specification is updated for a particular entity, particular embodiments may acknowledge receipt of the request, then record the updated specification (e.g., in a configuration database) together with an updated entity_version for the particular entity. The state transition request may be added to a write-ahead log (WAL), and then particular embodiments may check placement, policies, and availability of resources as required by the state transition request. Particular embodiments may parse the state transition request into sub-state transition requests. Particular embodiments may identify one or more steps required to evolve the current state of the virtualization environment to attain the target state, and then attempt to perform the one or more steps. Particular embodiments may take a snapshot of the current state as a backup in case the steps required to evolve the current state of the virtualization environment cannot be completed. If required resources are unavailable to perform one of the steps, particular embodiments may roll back changes made as part of the state transition request and retry evolution later; particular embodiments may keep attempting to evolve the current state of the virtualization environment until the target state specification has been implemented. Particular embodiments provide:

A mechanism for efficient execution of intents based on load characteristics of the system.

An efficient algorithm for bulk update of large number of TTLs for expired intents.

A single (efficient) watcher for multiple intent TTL expirations.

An intelligent retry mechanism to process intent spec failures based on binary back off algorithm.

A QoS-based approach for spec recovery (without causing starvation for low priority specifications)

PAT-241: Particular embodiments may provide an intelligent frontend system that dynamically builds user interface components like popups and widgets through the API intent specification. By reading the REST API and entity descriptions generated by the intent backend system, the GUI views and models that communicate using the APIs may be auto-generated and modified. The framework may provide ease of development for GUI projects that communicate to the intent backend system without building things from scratch. It may also allow developers to build custom reusable widgets.

PAT-242: Particular embodiments may provide for annotation of entries. Particular embodiments may provide the ability to build a full and complete specification based on a high-level description. In order to do that, particular embodiments may pull details of related entities/sub intents to render the UI. For example, if the creation of a VM in a project requires specification of the particular network the VM is to be placed in, particular embodiments may extend the specification to facilitate annotations that allow the GUI to pull relevant data from APIs for other entities (e.g., network).

PAT-243: Particular embodiments may provide the ability to snapshot a data center. For each entity supported in the system which requires snapshotting, the intent framework may define associated entity entity_name_snapshot as a first class type. This may facilitate snapshotting an entity with a deep hierarchy, wherein particular embodiments process the associated entities recursively or in a predetermined order to snapshot the entire entity. This may be extended to snapshot the entire data center.

PAT-244: Particular embodiments may provide the ability to backup a data center. For each entity supported in the system which requires preservation of backups, the intent framework may define associated entity entity_name_backup as a first class type. This may facilitate snapshotting an entity with a deep hierarchy, wherein particular embodiments process the associated entities recursively or in a predetermined order to snapshot the entire entity. This may be extended to snapshot the entire data center.

PAT-245: As referenced above in the example entity specification, particular embodiments may provide an API and/or a GUI for specifying external providers for entities and properties. The provider section lists a set of scopes and the corresponding provider. The scope listed in the providers section may be assumed to be handled by the provider (e.g., a firewall provider can handle a particular scope, such as "spec.resources.secure" and mark that part of the specification/API when it has secured the VM.

```
"status": {
   "name": "string"
   "providers": {
      "scope": "provider_name"
      "fields": ["string"]
      "key": "value"
      "key": "value"
   }
}
```

In particular embodiments, scope may comprise the path in the object "spec" that the provider acts on (e.g., "spec.policies.backup"), and provider_name may comprise the name of the provider. In particular embodiments, fields may comprise a list of fields within the scope that the provider acts upon, e.g., ["retention_period", "rpo"]. When fields is missing, that may imply that the provider is responsible for all fields in the scope. In particular embodiments, "key": "value" may comprise key-value pairs evaluated by the provider (e.g., values may be string, integer or Boolean).

PAT-250: Particular embodiments may specify and enforce entity compliance in relation to an API and/or remote procedure call (RPC). Every base entity has a/compliance sub-resource that returns the portion of the "spec" that is either enforced or monitored by an explicit profile set by the admin. The compliance sub-resource is read-only for the user. The system updates this every time a new entity matches or ceases to match a profile filter. It is defined as follows:

```
{
   "api_version": "string",
   "metadata": {
      "type": "compliance"
      "enforced_spec": { ... }
      "UUID": "string"
      "description": "string"
      "parent_reference": "reference"
      "entity_version": "int"
      "creation_time": "string"
      "last_update_time": "string"
      "categories": {
         "category_name1": "value"
         "category_name2": "value"
      }
   }
}
```

The compliance status of profiles may be used by a GUI to show entity compliance/non-compliance with the overall system. Particular embodiments may trigger an alert PAT-314: Particular embodiments may switch data sources during rolling upgrade of a leader-based distributed service with minimal disruptions. One risk of the rolling upgrade may be: while the upgrade is in progress, the master instance could be either running the older version or the newer version. In order to avoid this conflict, particular embodiments only switch to the new data source once the rolling upgrade has completed on all nodes in the cluster. If the cluster is currently being upgraded, particular embodiments may set up a watch to get notified about upgrade completion. On completion, particular embodiments may restart the cluster to ensure the that leader node stops dispatching tasks from the old data source. Once the cluster is done upgrading, the leader node may migrate tasks from the old data source to the new data source, then set a flag to indicate that task migration is complete. At this point, particular embodiments may determine whether the cluster is done with the upgrade. If task migration is complete, then particular embodiments may return the new data store object. If not, then particular embodiments may wait for some time and then proceed with object creation.

PAT-210: Concurrent task execution in a distributed system has been performed traditionally in one of the following ways:
1. Client loops through each of the computation units in the distributed system and distribute the workload to different endpoints. Deficiencies:
   a. This puts onus on the client to perform task distribution.
   b. Client may not be in the best position to know load characteristics on the server.
   c. If API execution fails due to node crash, client needs to re-submit the API request.
2. The server is setup using master-slave configuration. A single master node receives all task requests and forwards them to the slaves for execution. Deficiencies:
   a. There are extra overheads at bootstrap to elect the "master".
   b. Master node becomes the single bottleneck for API/request submission.
   c. The master node will spend more resources on accepting task requests and delegating them. This will shave off time and resources spent on actual execution.
   d. Master node has to keep track of APIs being executed by slave and restart if necessary.
3. Using a distributed task execution queue—the distributed system may setup a shared queue or request pipeline, which is accessible to all the computation nodes on the clustered system. Deficiencies:
   a. There are significant CPU, memory and storage overheads in hosting a distributed queue. This will reduce overall system efficiency.
   b. Need for reliance on third party software to host the shared bus.
   c. If the request pipeline is in memory, it is susceptible to system crashes and may require re-submission by the client.

Particular embodiments provide a distributed architecture that may enable concurrent task execution on multiple nodes without incurring the overhead or complexity of the traditional approaches described above.
1. The architecture proposes that the client may submit APIs to any endpoint unit in the cluster.
2. An instance of the task execution engine will run on every computation unit. Any task engine that receives the request may process the request and save it to the persistent store.
3. Each instance of the engine may run an algorithm to periodically scan the database for a list of submitted requests which do not have an owner. If there is one available, it picks the first request for execution and claims ownership.
4. This scheme may handle race conditions between different nodes by having the first instance successfully claiming ownership of an API request and having the other(s) backing off gracefully.
5. Every engine instance may periodically update API requests in flight to indicate the liveness of execution.

6. Every node may run a scheduled reaper process to detect API requests that are stuck due to crashes or node downtime and reset their ownership so they are eligible for re-execution.

Particular embodiments may: achieve uniform and equitable work distribution on the cluster and a higher net system throughput; API requests are resilient to node downtime and are automatically restarted on another node; the architecture may naturally and inherently scale out because it is based on active-active node configuration rather than leadership or master-slave based. Particular embodiments may achieve none, one, some, or all of the following improvements:

1. Superior execution efficiency by eliminating hard locks and substituting with an intra-cluster co-operative scheme.
2. Since the API submission is persisted, it provides crash consistency.
3. System provides resilience against node crashes and automatically continues API execution on a different node.
4. Task execution can naturally scale out by adding more processing nodes to the system when needed.
5. API execution is more efficient since there are no overheads of request delegation from master to slave or allocating resources for shared queues.
6. Work distribution is more uniform since it decouples the submission endpoint from the execution endpoint.

PAT-313: Particular embodiments provide an intent-based command line interface (CLI) in the context of distributed systems. Clients of procedural APIs expect granular operations to be performed on the entity of interest. Intentful systems have a different requirement, where the CLI options should closely mirror the behavior of the backend. Hence, the need is to expose CLI commands that can submit state transition requests and track their completion status. Particular embodiments solve this problem to deliver an interface that is easy, lightweight and convenient on-box or off-box.

Particular embodiments may be based on a web socket protocol between the client and the server. The server endpoint listens on a well-defined port and accepts client connections after performing authentication. The client-server connection itself is encrypted over SSL and is maintained as a persistent connection. All the business logic to expose commands sits on the server side. The intent-based CLI request hits the server and the server sends a suitable response to the caller.

Some of the salient features may include:
1. CLI is intent-based rather than procedure-based.
2. Client server connection is secure and authenticated.
3. CLI provides goodies like tab completion and auto assist to help user create the CLI input request.
4. Client portion of the CLI is fairly lightweight. This ensures future changes to the CLI on server do not require redistributing/upgrading the client.
5. Client-server maintain a low fidelity persistent connection which is ideal for scripting clients and saves connection setup and teardown time and resources.
6. Intentful CLI provides automatic support for newer options without the need to implement boilerplate code. This allows easy extensibility and higher stability.

Particular embodiments may provide one or more of the following advantages:
1. Intent-based paradigm rather than procedure based.
2. Clients get to consume new functionality for free without need to upgrade.
3. Ability to build infrastructure as code.
4. Ability to implement commands as git pre- or post commit hooks.
5. CLI works for functionality exposed in a distributed environment.

Figure 2:
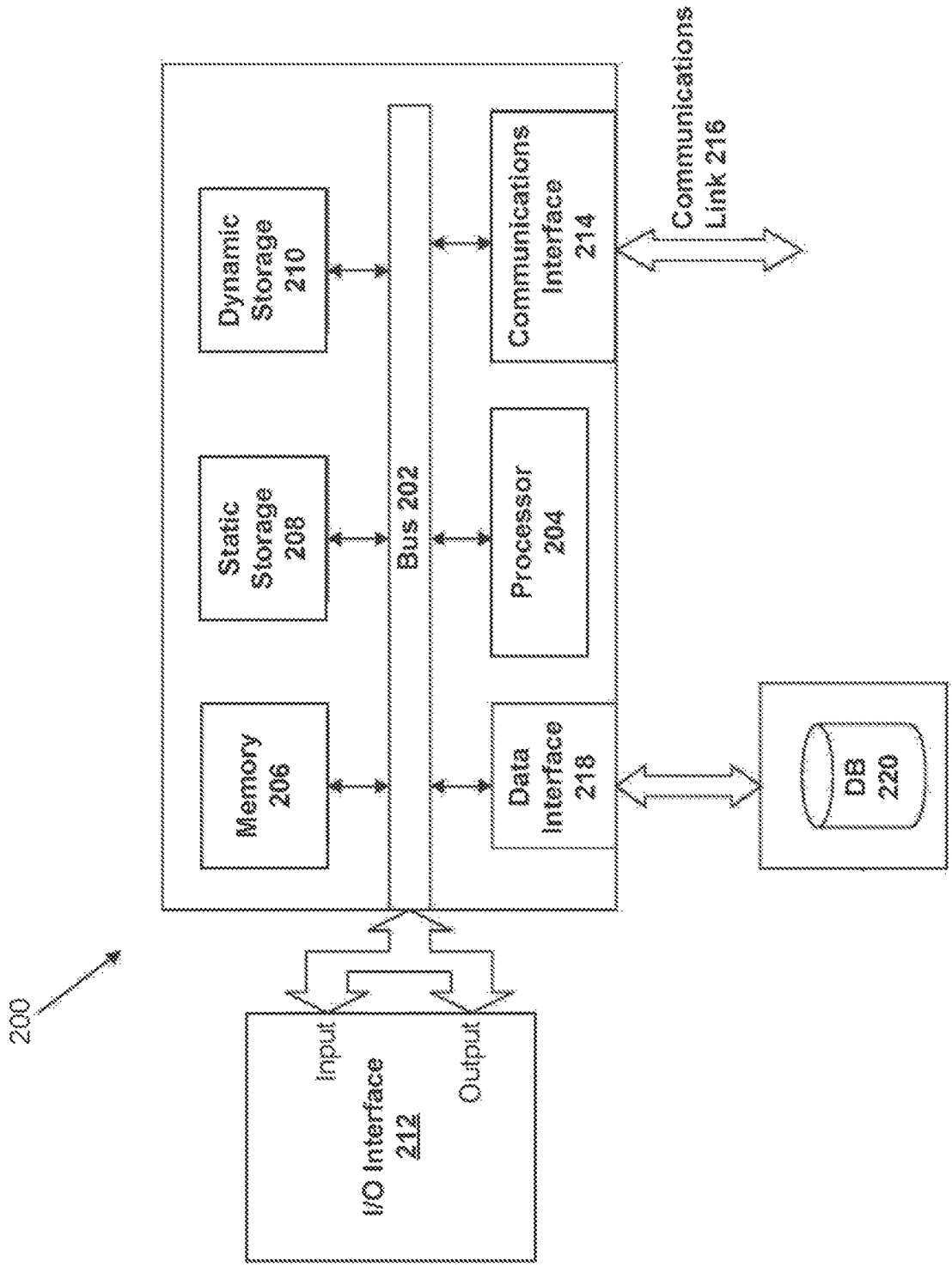
FIG. 2 is a block diagram of an illustrative computing system 200 suitable for implementing particular embodiments.

FIG. 2 is a block diagram of an illustrative computing system 200 suitable for implementing particular embodiments. In particular embodiments, one or more computer systems 200 perform one or more steps of one or more methods described or illustrated herein. In particular embodiments, one or more computer systems 200 provide functionality described or illustrated herein. In particular embodiments, software running on one or more computer systems 200 performs one or more steps of one or more methods described or illustrated herein or provides functionality described or illustrated herein. Particular embodiments include one or more portions of one or more computer systems 200. Herein, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

Computer system 200 includes a bus 202 (e.g., an address bus and a data bus) or other communication mechanism for communicating information, which interconnects subsystems and devices, such as processor 204, memory 206 (e.g., RAM), static storage 208 (e.g., ROM), dynamic storage 210 (e.g., magnetic or optical), communication interface 214 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 212 (e.g., keyboard, keypad, mouse, microphone). In particular embodiments, computer system 200 may include one or more of any such components.

In particular embodiments, processor 204 includes hardware for executing instructions, such as those making up a computer program. As an example and not by way of limitation, to execute instructions, processor 204 may retrieve (or fetch) the instructions from an internal register, an internal cache, memory 206, static storage 208, or dynamic storage 210; decode and execute them; and then write one or more results to an internal register, an internal cache, memory 206, static storage 208, or dynamic storage 210. In particular embodiments, processor 204 may include one or more internal caches for data, instructions, or addresses. This disclosure contemplates processor 204 including any suitable number of any suitable internal caches, where appropriate. As an example and not by way of limitation, processor 204 may include one or more instruction caches, one or more data caches, and one or more translation lookaside buffers (TLBs). Instructions in the instruction caches may be copies of instructions in memory 206, static storage 208, or dynamic storage 210, and the instruction caches may speed up retrieval of those instructions by processor 204. Data in the data caches may be copies of data in memory 206, static storage 208, or dynamic storage 210 for instructions executing at processor 204 to operate on; the results of previous instructions executed at processor 204 for access by subsequent instructions executing at processor 204 or for writing to memory 206, static storage 208, or dynamic storage 210; or other suitable data. The data caches may speed up read or write operations by processor 204. The TLBs may speed up virtual-address translation for processor 204. In particular embodiments, processor 204 may include one or more internal registers for data, instructions, or addresses. This disclosure contemplates processor 204 including any suitable number of any suitable internal registers, where appropriate. Where appropriate, processor 204 may include one or more arithmetic logic units (ALUs); be a multi-core processor; or include one or more processors 202. Although this disclosure describes and illustrates a particular processor, this disclosure contemplates any suitable processor.

In particular embodiments, I/O interface 212 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 212 for them. Where appropriate, I/O interface 212 may include one or more device or software drivers enabling processor 204 to drive one or more of these I/O devices. I/O interface 212 may include one or more I/O interfaces 212, where appropriate. Although this disclosure describes and illustrates a particular I/O interface, this disclosure contemplates any suitable I/O interface.

In particular embodiments, communication interface 214 includes hardware, software, or both providing one or more interfaces for communication (such as, for example, packet-based communication) between computer system 200 and one or more other computer systems 200 or one or more networks. As an example and not by way of limitation, communication interface 214 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 214 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 214 for any of these networks, where appropriate. Communication interface 214 may include one or more communication interfaces 214, where appropriate. Although this disclosure describes and illustrates a particular communication interface, this disclosure contemplates any suitable communication interface.

One or more memory buses (which may each include an address bus and a data bus) may couple processor 204 to memory 206. Bus 202 may include one or more memory buses, as described below. In particular embodiments, one or more memory management units (MMUs) reside between processor 204 and memory 206 and facilitate accesses to memory 206 requested by processor 204. In particular embodiments, memory 206 includes random access memory (RAM). This RAM may be volatile memory, where appropriate where appropriate, this RAM may be dynamic RAM (DRAM) or static RAM (SRAM). Moreover, where appropriate, this RAM may be single-ported or multi-ported RAM. This disclosure contemplates any suitable RAM. Memory 206 may include one or more memories 206, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 210 may include a hard disk drive (HDD), a floppy disk drive, flash memory, an optical disc, a magneto-optical disc, magnetic tape, or a Universal Serial Bus (USB) drive or a combination of two or more of these. Dynamic storage 210 may include removable or non-removable (or fixed) media, where appropriate. Dynamic storage 210 may be internal or external to computer system 200, where appropriate. This disclosure contemplates mass dynamic storage 210 taking any suitable physical form. Dynamic storage 210 may include one or more storage control units facilitating communication between processor 204 and dynamic storage 210, where appropriate.

In particular embodiments, bus 202 includes hardware, software, or both coupling components of computer system 200 to each other. As an example and not by way of limitation, bus 202 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 202 may include one or more buses 206, where appropriate. Although this disclosure describes and illustrates a particular bus, this disclosure contemplates any suitable bus or interconnect.

According particular embodiments, computer system 200 performs specific operations by processor 204 executing one or more sequences of one or more instructions contained in memory 206. Such instructions may be read into memory 206 from another computer readable/usable medium, such as static storage 208 or dynamic storage 210. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 204 for execution. Such a medium may take many forms, including but not limited to, nonvolatile media and volatile media. Non-volatile media includes, for example, optical or magnetic disks, such as static storage 208 or dynamic storage 210. Volatile media includes dynamic memory, such as memory 206.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 200; in alternative embodiments, two or more computer systems 200 coupled by communication link 216 (e.g., LAN, PTSN, or wireless network) may perform the sequence of instructions in coordination with one another.

Computer system 200 may transmit and receive messages, data, and instructions, including program, i.e., application code, through communication link 216 and communication interface 214. Received program code may be executed by processor 204 as it is received, and/or stored in static storage 208 or dynamic storage 210, or other non-volatile storage for later execution. A database 220 may be used to store data accessible by the system 200 by way of data interface 218.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by a first hardware server and from a remote computing device executing an intent-based CLI (command line interface), an operation-request for a list of operation commands compatible with the first server;
   building, by the first hardware server and in response to receipt of the operation-request, the list of operation commands supported by the first server, wherein the list of operation commands includes a first operation command supported on the first server and a second operation command supported on the first server;
   transmitting, by the first hardware server, the list of operation commands to the remote computing device causing the remote computing device to render the list of operation commands in the intent-based CLI;
   receiving, by the first hardware server, a connection-request from the intent-based CLI to establish a secure connection between the first server and the remote computing device; and
   establishing, by the first hardware server, a first communication channel between the first server and the remote computing device.

2. The method of claim 1, wherein the first operation command is supported by a first virtual machine executing on the first hardware server and the second operation command is supported by a second virtual machine executing on the first hardware server.

3. The method of claim 1, further comprising building, by a second hardware server, a new list of operation commands, wherein at least one operation command of the new list of operation commands comprises a plurality of operation commands supported by the first hardware server and the second hardware server.

4. The method of claim 1, wherein the operation-request created based on one of at least a tab completion system and an automatic assistant system.

5. The method of claim 1, further comprising:
   receiving, by the hardware first server, an operation command of the list of operation commands; and executing, by the hardware first server, the operation command as a versioning control hook.

6. The method of claim 1, further comprising:
receiving, by the hardware first server, a request to scale a virtual cluster; and
scaling, by the first hardware server and in response to the request to scale the virtual cluster, by executing a command to remove a first virtual machine from the virtual cluster or add a second virtual machine to the virtual cluster.

7. The method of claim 1, wherein the list of operation commands comprises at least one of a state transition request and a status completion request.

8. The method of claim 1, further comprising:
receiving, by the first hardware server, an intent-based operation of the list of intent-based operations; and
processing, by the first hardware server, the intent-based operation to a logical intent of the intent-based operation based on a single receipt of the intent-based operation by the first server.

9. The method of claim 1, wherein the secure connection is encrypted, and the first communication channel is an encrypted channel.

10. An apparatus including a processor and a memory having programmed instructions, wherein the processor executes the programmed instructions to cause the apparatus to:
receive, from a remote computing device executing an intent-based CLI (command line interface), an operation-request for a list of operation commands compatible with the apparatus;
build, in response to receipt of the operation-request, the list of operation commands supported by the apparatus, wherein the list of operation commands includes a first operation command supported on the first server and a second operation command supported on the first server;
transmit the list of operation commands to the remote computing device causing the remote computing device to render the list of operation calls in the intent-based CLI;
receive a connection-request from the intent-based CLI to establish a secure connection between the first server and the remote computing device; and
establish a first communication channel between the first server and the remote computing device.

11. The apparatus of claim 10, wherein the first operation command is supported by a first virtual machine executing on the first server and the second operation command is supported by a second virtual machine executing on the first server.

12. The apparatus of claim 10, wherein the apparatus has further programmed instructions to build a new list of operation commands, wherein at least one operation command of the new list of operation commands comprises a plurality of operation commands supported by the apparatus.

13. The apparatus of claim 10, wherein the operation-request created based on one of at least a tab completion system and an automatic assistant system.

14. The apparatus of claim 10, wherein the apparatus has further programmed instructions to:
receive an operation command of the list of operation commands; and
execute the operation command as a versioning control hook.

15. The apparatus of claim 10, wherein the apparatus has further programmed instructions to:
receive a request to scale a virtual cluster; and
scale, in response to the request to scale the virtual cluster, by executing a command to remove a first virtual machine from the virtual cluster or add a second virtual machine to the virtual cluster.

16. The apparatus of claim 10, wherein the apparatus has further programmed instructions to:
receive an operation command of the list of operation commands; and
process the operation command to a logical intent of the operation command based on a single receipt of the operation command by the apparatus.

17. The apparatus of claim 10, wherein the secure connection is encrypted, and the first communication channel is an encrypted channel.

18. A non-transitory computer readable medium having a processor-executable instructions embodied thereon that, upon execution by a processor, the processor-executable instructions for causing the processor to perform steps of:
receiving, from a remote computing device executing an intent-based CLI (command line interface), an operation-request for a list of operation commands compatible with the processor;
building, in response to receipt of the operation-request, the list of operation commands supported by the processor, wherein the list of operation commands includes a first operation command supported on the first server and a second operation command supported on the first server;
transmitting the list of operation commands to the remote computing device causing the remote computing device to render the list of operation commands in the intent-based CLI;
receiving a connection-request from the intent-based CLI to establish a secure connection between the processor and the remote computing device; and
establishing a first communication channel between the processor and the remote computing device.

19. The storage device of claim 18, wherein the operation-request created based on one of at least a tab completion system and an automatic assistant system.

20. The storage device of claim 18, the steps further comprising:
receiving an operation command of the list of operation commands; and
executing the operation command as a versioning control hook.

21. The storage device of claim 18, the steps further comprising:
receiving a request to scale a virtual cluster; and
scaling, in response to the request to scale the virtual cluster, by executing a command to remove a first virtual machine from the virtual cluster or add a second virtual machine to the virtual cluster.

22. The storage device of claim 18, wherein the list of operation commands comprises at least one of a state transition request and a status completion request.

23. The storage device of claim 18, the steps further comprising:
receiving an operation command of the list of operation commands; and
processing the operation command to a logical intent of the operation command based on a single receipt of the operation command by the processor.

24. The storage device of claim 18, wherein the secure connection is encrypted, and the first communication channel is an encrypted channel.

\* \* \* \* \*